United States Patent
Miskiewicz et al.

(10) Patent No.: US 9,674,682 B2
(45) Date of Patent: Jun. 6, 2017

(54) ENABLING D2D FUNCTIONALITY FOR PUBLIC SAFETY APPLICATIONS

(71) Applicant: INTEL IP CORPORATION, Santa Clara, CA (US)

(72) Inventors: Anna Miskiewicz, Beijing (CN); Sabine Roessel, Munich (DE); Robert Zaus, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 16 days.

(21) Appl. No.: 14/497,913

(22) Filed: Sep. 26, 2014

(65) Prior Publication Data
US 2015/0215757 A1  Jul. 30, 2015

Related U.S. Application Data

(60) Provisional application No. 61/933,858, filed on Jan. 30, 2014.

(51) Int. Cl.
*H04M 11/04* (2006.01)
*H04W 4/22* (2009.01)
*H04W 48/10* (2009.01)
*H04W 48/12* (2009.01)
*H04W 76/02* (2009.01)
*H04W 88/04* (2009.01)

(52) U.S. Cl.
CPC ............ *H04W 4/22* (2013.01); *H04W 48/10* (2013.01); *H04W 48/12* (2013.01); *H04W 76/023* (2013.01); *H04W 88/04* (2013.01)

(58) Field of Classification Search
CPC ............................. H04W 4/22; H04W 68/00
See application file for complete search history.

(56) References Cited

U.S. PATENT DOCUMENTS

| | | | |
|---|---|---|---|
| 2009/0239554 A1* | 9/2009 | Sammour | H04W 4/22 455/458 |
| 2010/0026472 A1* | 2/2010 | Kitazoe | G08B 27/006 340/311.2 |
| 2010/0216421 A1* | 8/2010 | Hsu | H04W 4/22 455/404.1 |

(Continued)

FOREIGN PATENT DOCUMENTS

WO   WO 2013-095001 A1   6/2013

OTHER PUBLICATIONS

International Search Report and Written Opinion mailed May 6, 2015 for International Application No. PCT/US2015/013282, 12 pages.

(Continued)

*Primary Examiner* — Kwasi Karikari
(74) *Attorney, Agent, or Firm* — Schwabe, Williamson & Wyatt, P.C.

(57) ABSTRACT

Embodiments of the present disclosure describe apparatuses and methods for enabling device-to-device (D2D) functionality for public safety applications. Various embodiments may include an eNB with a radio transceiver to communicate with a UE that includes D2D operation capabilities, and processing circuitry to send the UE a System Information Block (SIB) message to activate one or more public safety functionalities of the UE related to D2D operation. Other embodiments may be described and/or claimed.

24 Claims, 6 Drawing Sheets

(56) References Cited

U.S. PATENT DOCUMENTS

| | | | |
|---|---|---|---|
| 2011/0059718 A1* | 3/2011 | Wang | H04W 4/22 455/404.1 |
| 2012/0039171 A1* | 2/2012 | Yamada | H04L 47/12 370/232 |
| 2012/0163235 A1 | 6/2012 | Ho et al. | |
| 2013/0023227 A1* | 1/2013 | Yokoyama | H04W 4/22 455/404.1 |
| 2013/0347084 A1 | 12/2013 | Malinowski | |
| 2014/0004796 A1* | 1/2014 | Cakulev | H04W 76/023 455/41.2 |
| 2014/0010179 A1 | 1/2014 | Lee | |
| 2014/0066001 A1* | 3/2014 | Lee | H04W 4/023 455/404.2 |
| 2015/0004927 A1* | 1/2015 | Mao | H04W 72/10 455/404.2 |

OTHER PUBLICATIONS

Office Action issued Feb. 23, 2016 from Taiwan Patent Application No. 104102889, 8 pages.

\* cited by examiner

ENABLING D2D FUNCTIONALITY FOR PUBLIC SAFETY APPLICATIONS

CROSS REFERENCE TO RELATED APPLICATION

The present application claims priority to U.S. Provisional Patent Application No. 61/933,858, filed Jan. 30, 2014, entitled "ENABLING D2D FUNCTIONALITY FOR PUBLIC SAFETY APPLICATIONS," the entire disclosure of which is hereby incorporated by reference in its entirety.

FIELD

Embodiments of the present disclosure generally relate to the field of wireless communication, and more particularly, to apparatuses and methods for enabling device-to-device (D2D) functionality.

BACKGROUND

The background description provided herein is for generally presenting the context of the disclosure. Unless otherwise indicated herein, the materials described in this section are not prior art to the claims in this application and are not admitted to be prior art or suggestions of the prior art, by inclusion in this section.

D2D applications may provide a scalable and universal framework for connecting proximity peers. There are different technology solutions for D2D applications, e.g., based on WiFi Direct or Near Field Communication (NFC) technology. A special solution that relates to the 3rd Generation Partnership Project (3GPP) is Proximity Services (ProSe) for Commercial and Public Safety use cases as well as Long-Term Evolution (LTE) Direct for Commercial and Public Safety use cases.

The aforementioned standards may provide a wide range of configurability for User Equipment (UE) devices supporting such standards. For example, it may be possible to configure a UE into a discovery or relay mode. However, the versatile configurability may also enable a UE to limit or entirely stop the communication measures for all related use-cases, including Public Safety use cases.

On the other hand, the D2D functionality for public safety applications may be disabled due to Original Equipment Manufacturer (OEM) or operator configuration, as well as some special security settings, e.g., where no D2D operation may be allowed for security reasons or on government administration devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
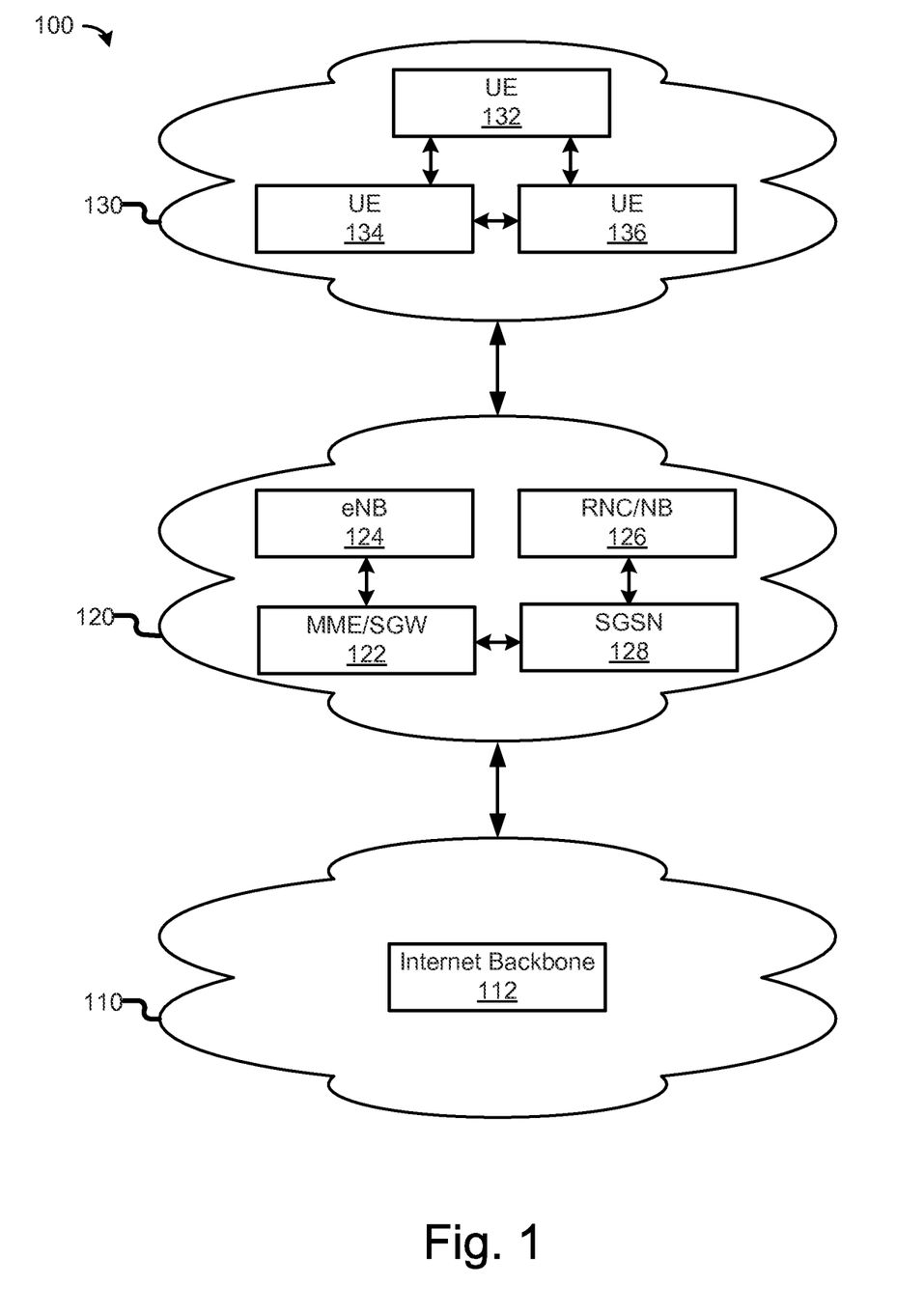
FIG. 1 schematically illustrates a wireless communication system in accordance with various embodiments.

FIG. 1 schematically illustrates a wireless communication system 100 in accordance with various embodiments. The wireless communication system 100 may include a backbone network 110, a cellular mobile network 120, and a D2D network 130.

The backbone network 110 may be a part of computer network infrastructure that interconnects various sub-networks and provides a path for the exchange of information between these sub-networks. In various embodiments, the backbone network 110 may include Internet backbone 112, which may include the principal data routes between large, strategically interconnected computer networks and core routers on the Internet.

The cellular mobile network 120 may be connected to the backbone network 110. In various embodiments, the cellular mobile network 120 may include one or more radio access networks, such as a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. In some embodiments, a radio access network may include GSM Enhanced Data rates for GSM Evolution (EDGE) Radio Access Network (GERAN), Universal Terrestrial Radio Access Network (UTRAN), or Evolved UTRAN (E-UTRAN). The cellular mobile network 120 may operate in accordance with other network technologies in other embodiments.

Mobile communication technology may rely on various standards and protocols to transmit data between a base station and a wireless communication device. Wireless communication system standards and protocols may include, for example, the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN), according to LTE, the base station may be referred to as an evolved Node B (also commonly denoted as eNodeB, or eNB). It may communicate with a wireless communication device, known as user equipment (UE). Although the present disclosure is presented with terminology and examples generally directed toward 3GPP systems and standards, the teaching disclosed herein may be applied to any type of wireless network or communication standard.

In various embodiments, the cellular mobile network 120 may include eNB 124, RNC and NB 126, mobility management entities (MME) and serving gateways (SGW) 122, and serving GPRS support nodes (SGSN) 128. eNB 124 may be more intelligent than legacy NB 126, which may be used in a 3G network such as a UMTS network. For example, radio network controller (RNC) functionality may be located in eNB 124 rather than being in a separate RNC entity. In LTE, eNB 124 may connect to another eNB by means of an X2 interface that allows the eNBs to forward or share information. In some embodiments, the cellular mobile network 120 may be an Internet Protocol (IP) based network, wherein interfaces between network entities (e.g., eNB 124 and MME/SGW 122) may be based on IP. In some embodiments, MME/SGW 122 may communicate with eNB 124 over an S1 interface. The S1 interface may be similar to the S1 interface as defined in 3GPP TS 36.410 V11.1.0 (2013 September) and may support a many-to-many relation between MME/SGW 122 and eNB 124. For example, different operators may simultaneously operate the same eNB in a network sharing setting. In some embodiments, communication between the eNB 124 and UEs may be facilitated via the MME/SGW 122. The MME/SGW 122 may be configured to manage signaling exchanges, e.g., authentication of the UE 132, or perform other actions associated with establishment of a communication link to establish a connected mode of the UE 132 with the cellular mobile network 120. In some embodiments, the MME/SGW 122 may be responsible for tracking and paging user equipment, e.g., when the UE 132 is in an idle mode.

For ease of illustration, various descriptions herein are provided to conform to 3GPP in the communication system 100; however, the subject matter of the present disclosure is not limited in this regard and the embodiments disclosed herein may be advantageously applied to other wired or wireless communication protocols or networks. For example, in an embodiment in which the cellular mobile network 120 includes a UTRAN, the eNB 124 may represent a radio network controller (RNC) configured to communicate with the UEs 132, 134, or 136 (discussed in additional detail below) via a NB. In an embodiment where the cellular mobile network 120 includes a GERAN, the eNB 124 may represent a base station controller (BSC) configured to communicate with the UEs 132, 134, or 136 via a base transmission station (BTS).

In various embodiments, the UE 132 may access the cellular mobile network 120 via a radio link with one of the base stations, e.g., eNB 124. A downlink (DL) transmission may be a communication from the eNB 124 to the UE 132. An uplink (UL) transmission may be a communication from the UE 132 to the eNB 124. Only limited numbers of UEs and eNBs are illustrated in FIG. 1 for ease of illustration. However, the communication system 100 may include any number of UEs, eNBs, or other servers while practicing suitable embodiments of the present disclosure. As an example, in some embodiments, the cellular mobile network 120 may also include other servers, such as a machine type communication (MTC) server (not shown) to facilitate MTC.

In some embodiments, the UE 134 may be configured to communicate with another machine. Data may be transmitted from the UE 134 to another machine or received by the UE 134 from another machine with the need for little or no human interaction. For example, the UE 134 may be a sensor that is electrically coupled to a wireless transceiver (e.g., the transceiver circuitry 224, discussed below with reference to FIG. 2), and may be configured to communicate, with little or no intervention, with another machine (e.g., another sensor). In some embodiments, the wireless transceiver of the UE 134 may also be configured to communicate with at least one of a wireless metropolitan area network (WMAN), a wireless local area network (WLAN), or a wireless personal area network (WPAN).

In some embodiments, the UE 136 may be a mobile communication device, a subscriber station, or another device that is configured to communicate with the cellular mobile network 120, e.g., via the eNB 124, in conformance with an appropriate protocol (e.g., a multiple-input/multiple-output (MIMO) communication scheme). As discussed in further detail below, the UEs, 132, 134, and/or 136 may be configured to enable D2D functionality for public safety applications, e.g., upon receiving a special System Information Block (SIB) message from eNB 124.

In various embodiments, UE 132, UE 134, and UE 136 may form a D2D network 130. In the D2D network 130, two UEs in proximity may directly communicate with each other without the assistance of eNB 124 or any other base stations and cellular mobile networks. Direct communication between devices is commonly known as device-to-device (D2D) direct communication or peer-to-peer (P2P) communication.

D2D operation in the D2D network 130 may be non-transparent to the cellular mobile network 120 and may occur on a cellular spectrum (i.e., inband) or unlicensed spectrum (i.e., outband). D2D operation in the D2D network 130 may be realized in different communication technologies. In some embodiments, short-range technologies, such as Bluetooth or Wi-Fi may be used. In some embodiments, D2D operation may reuse licensed LTE spectrum or unlicensed LTE spectrum.

In various embodiments, D2D operation in the D2D network 130 may first include device discovery, whereby UEs are to determine whether they are within range and/or available for D2D operation before establishing a D2D session. Proximity detection may be assisted by the cellular mobile network 120, may be performed at least partially by UEs, or may be performed largely by UEs independently.

In various embodiments, D2D discovery may be closed D2D discovery or open D2D discovery. Closed D2D discovery may apply to use cases wherein a discoverable device may be discovered only by a select set of D2D-enabled discovering devices. For example, only pre-identified or selected devices may be allowed to connect, such as devices identified or selected by the cellular mobile network 120, a D2D server (not shown), an application (not shown), or a user (not shown). Thus, for this use case, a discovering device would be assumed to know, in advance, the D2D-enabled devices it wishes to discover in its proximity, including any corresponding identifiers.

On the other hand, open device discovery considers use cases wherein a discoverable device may want itself to be discovered by any or all D2D-enabled devices in its proximity. From the perspective of the discovering device, open device discovery implies that a discovering device may not be aware of the identity of other D2D enabled devices prior to discovery. Consequently, the device discovery mechanism for open discovery may aim toward discovering as many D2D-enabled devices in its proximity as possible.

In certain situations, such as for open D2D discovery using licensed resources, an eNB may have limited control of the discovery process among UEs. In particular, an eNB may periodically allocate certain discovery resources in the form of D2D discovery regions (e.g., time/frequency resources such as resource blocks or subframes) for UEs to transmit the discovery information. The discovery information may be in the form of a discovery sequence or discovery packet with payload information.

In various embodiments, D2D operation in the D2D network 130 may improve spectrum utilization, increase network throughput, reduce transmission delay, offload traffic for eNB 124, and alleviate congestion in the cellular mobile network 120. In this regard, D2D operation may have a wide variety of applications. For example, D2D network 130 may be used for local social networks, content sharing, location-based marketing, service advertisements, mobile-to-mobile applications, etc. Enhanced by the teachings in this disclosure, the D2D network 130 may become a fallback public safety network that may function even when the cellular mobile network 120 becomes unavailable or fails.

In the scope of the Public Safety use cases, correct configuration of the device to operate in a Public Safety mode is crucial in the case of emergencies, at least for the user's safety. In various embodiments, the communication system 100 may use a unified method (further discussed below) to automatically configure all the devices, e.g., UEs 132, 134, and 136, within the area of emergency into a Public Safety mode where all applicable operation modes (e.g. communication) may be enabled. Following 3GPP terminology for D2D, in the present disclosure, D2D communication includes only the broadcast of information. In some embodiments, dependent on regulatory requirements, such a configuration may be enabled despite pre-configured user, OEM, operator, or company policies. In some embodiments, the Public Safety use case may be enabled independent of the underlying standards (e.g., LTE Direct or ProSe) as well as the device configuration status (e.g., idle or connected).

Figure 2:
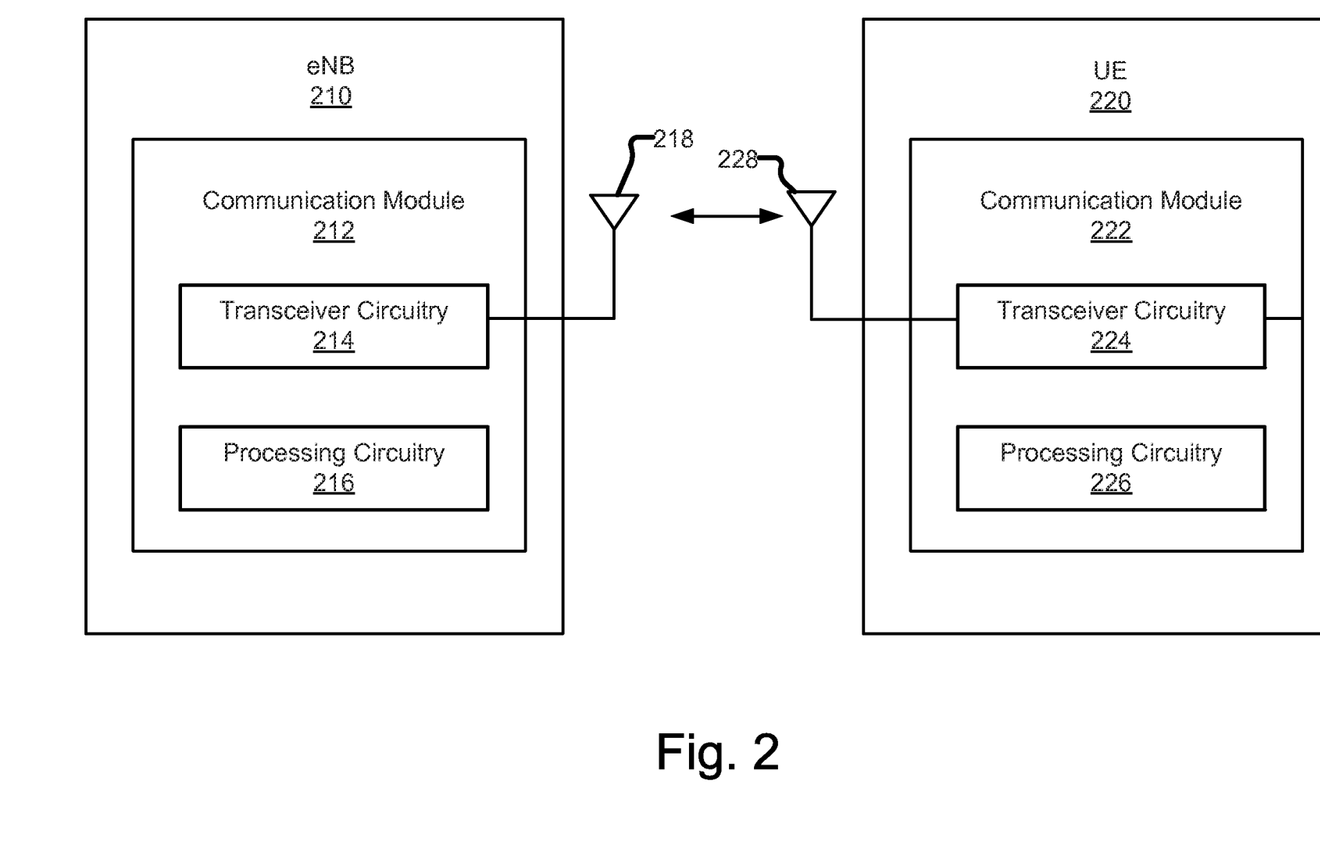
FIG. 2 is a schematic block diagram illustrating components of an enhanced node B (eNB) and a UE in the wireless communication system in accordance with various embodiments.

FIG. 2 is a schematic block diagram illustrating components of an eNB 210 and a UE 220 in a wireless communication environment in accordance with various embodiments. The eNB 210 may be similar to, and substantially interchangeable with eNB 124 of FIG. 1. In embodiments, the eNB 210 may include one or more antennas 218 and communication module 212. In various embodiments, transceiver circuitry 214 and processing circuitry 216 within the communication module 212 may be coupled with each other as shown. Likewise, the UE 220 may be similar to, and substantially interchangeable with UE 132, 134, or 136 of FIG. 1. In embodiments, the UE 220 may include one or more antennas 228 and communication device 222. In various embodiments, transceiver circuitry 224 and processing circuitry 226 within the communication module 222 may be coupled with each other as shown.

The transceiver circuitry 214 may be coupled with the antennas 218 to facilitate over-the-air communication of signals to/from the eNB 210. Operations of the transceiver circuitry 214 may include, but are not limited to, filtering, amplifying, storing, modulating, demodulating, transforming, etc. In various embodiments, the transceiver circuitry 214 may be configured to provide various signal processing operations on the signal to the antennas 218 with appropriate characteristics. In some embodiments, the transceiver circuitry 214 may be configured to communicate with UEs that have D2D operation capabilities.

The transceiver circuitry 214 may be configured to receive signals from the antennas 218 for transmission to other components of the eNB 210 and/or for internal processing by the processing circuitry 216. In some embodiments, the processing circuitry 216 may generate System Information Block (SIB) messages to activate one or more public safety functionalities of the UE 220 related to D2D operation. The processing circuitry 216 may further transmit configuration and control information relating to public safety to other access nodes over backhaul links, e.g., to further facilitate D2D operation of the UE 220.

The processing circuitry 216 may generate configuration and control information to UEs of a serving cell, e.g., UE 220. The configuration and control information may include, for example, downlink channel information, downlink control information (DCI), radio resource control (RRC) configuration information, etc. In some embodiments, such configuration and control information may include a SIB message to activate at least one of D2D discovery, D2D communication, or D2D relay functionality of the UE 220. In various embodiments, the processing circuitry 216 may generate different types of SIB messages for UE 220. As an example, processing circuitry 216 may generate a first-type SIB message for primary notification, followed by a second-type SIB message for secondary notification with authorization or configuration information for D2D operation. In various embodiments, the secondary notification to UE 220 may include information for preferred frequency spectrum for D2D operation, information for D2D synchronization source set-up, a public safety alert, or a public safety release message.

In various embodiments, processing circuitry 216 may generate aforementioned SIB messages to numerous selected UEs in an alert region, for example, to build the D2D network 130 of FIG. 1. In some embodiments, communication module 212 may send the first-type SIB message with primary notification via Paging. A paging message may be used to inform UEs in RRC_IDLE as well as in RRC_CONNECTED modes. In some embodiments, communication module 212 may send the second-type SIB message with secondary notification via Cell Broadcast Service (CBS).

Similar to the communication module 212, the communication module 222 may be coupled with the antennas 228 to facilitate over-the-air communication of signals between UE 220 and eNB 210 or between UE 220 and another UE. For example, the transceiver circuitry 224 may be configured to provide various signal processing operations on the signal to the antennas 228 with suitable characteristics. In various embodiments, operations of the transceiver circuitry 224 may include, but are not limited to, filtering, amplifying, storing, modulating, demodulating, transforming, etc.

The transceiver circuitry 224 may be configured to receive signals from the antennas 218, and then transmit the signals to other components of the UE 220 and/or for internal processing by the processing circuitry 226. In some embodiments, the processing circuitry 226 may activate the UE 220 into a public safety mode in response to a primary notification in a SIB message received from the eNB 210. Further, the processing circuitry 226 may configure the UE 220 for various public safety functions based on D2D operation within the public safety mode.

In some embodiments, the communication module 222 may be configured to receive the primary notification in a Paging Type 1 message if the UE 220 is in an RRC_IDLE state. In some embodiments, the communication module 222 may be configured to receive the primary notification in a System Information Change Indication (SICI) message if the UE is in an RRC_CONNECTED state. In some embodiments, the processing circuitry 226 may activate, in response to the primary notification, a reception of one or more cell broadcast messages containing one or more secondary notifications with authorization or configuration information for D2D operation. Thus, with the information contained in the secondary notifications, UE 220 may be properly configured for D2D operation, such as with preferred spectrums for D2D operation or proper D2D synchronization sources.

In some embodiments, in response to the primary notification, the processing circuitry 226 may present to the user of the UE 220 an audio or visual warning message. As an example, the warning notification may show information of a public safety alert contained in the primary notification. As another example, the warning notification may convey the information about the availability of the Public Safety feature on the UE 220 to the user. As yet another example, the warning notification may demonstrate one or more public safety features enabled at the UE 220.

Therefore, the user would be informed about the communication means with other users in the emergency area even if the user were previously not aware of such capability on the device. In some embodiments, such warning notification may be contained in the primary or secondary notification distributed by the eNB 210. In other embodiments, such warning notification may be generated locally by the UE 220, for example, based on the received primary notification, and displayed by the UE 220 upon activating one or more Public Safety features.

In some embodiments, the UE 220 may include one or more antennas 228 to concurrently utilize radio resources of multiple respective component carriers. For example, the UE 220 may be configured to communicate using Orthogonal Frequency Division Multiple Access (OFDMA) (in, e.g., downlink communications) and/or Single-Carrier Frequency Division Multiple Access (SC-FDMA) (in, e.g., uplink communications). In some embodiments, the UE 220 may use the transceiver circuitry 224 to communicate with another UE via LTE ProSe or LTE Direct.

In some embodiments, communication module 222 may be configured to provide communication services for one or more subscriber identity modules (SIMs) (not shown) with which it is coupled. In some embodiments, the SIMs may be removably coupled with the communication module 222. In other embodiments, the SIMs may be hardware and/or firmware that are permanently coupled with the UE 220. In various embodiments, the SIMs may include full-size SIMs, mini-SIMs, micro-SIMs, nano-SIMs, embedded SIMs, and/or virtual SIMs.

The SIMs may be integrated circuits that securely store subscriber identity information such as international mobile subscriber identity (IMSI) and related keys used to identify and authenticate one or more subscribers using the UE 220. Each SIM may be associated with different subscriber identity information and may or may not be associated with different carriers. In various embodiments, IMSI and related information may be used to facilitate D2D discovery and D2D operation.

Figure 5:
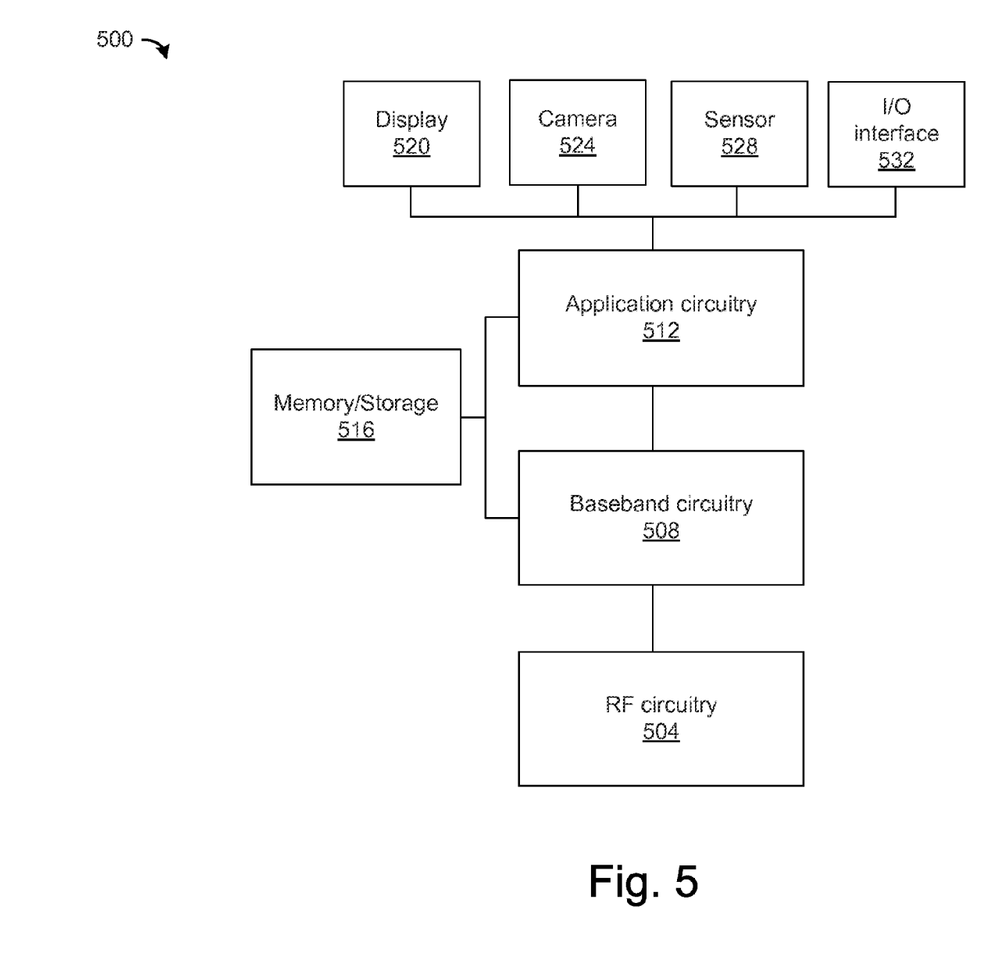
FIG. 5 is a block diagram of an example computing device that may be used to practice various embodiments described herein.

Some or all of the transceiver circuitry 224 and/or processing circuitry 226 may be included in, for example, radio frequency (RF) circuitry or baseband circuitry as described below with respect to FIG. 5. In various embodiments the UE 220 may be, may include, or may be included in a single sensor device, a cellular telephone, a personal computer (PC), a notebook, an ultrabook, a netbook, a smartphone, an ultra mobile PC (UMPC), a handheld mobile device, an universal integrated circuit card (UICC), a personal digital assistant (PDA), a Customer Premise Equipment (CPE), a tablet computing device, or other consumer electronics such as MP3 players, digital cameras, and the like. In some embodiments, the UE may include a mobile station, as defined by IEEE 802.16e (2005 or 802.16m (2009) or some other revision of the IEEE 802.16 standard, or user equipment, as defined by 3GPP LTE Release 8 (2008), Release 9 (2009), Release 10 (2011), Release 12 (under development), or some other revision or release of the 3GPP LTE standards.

Figure 3:
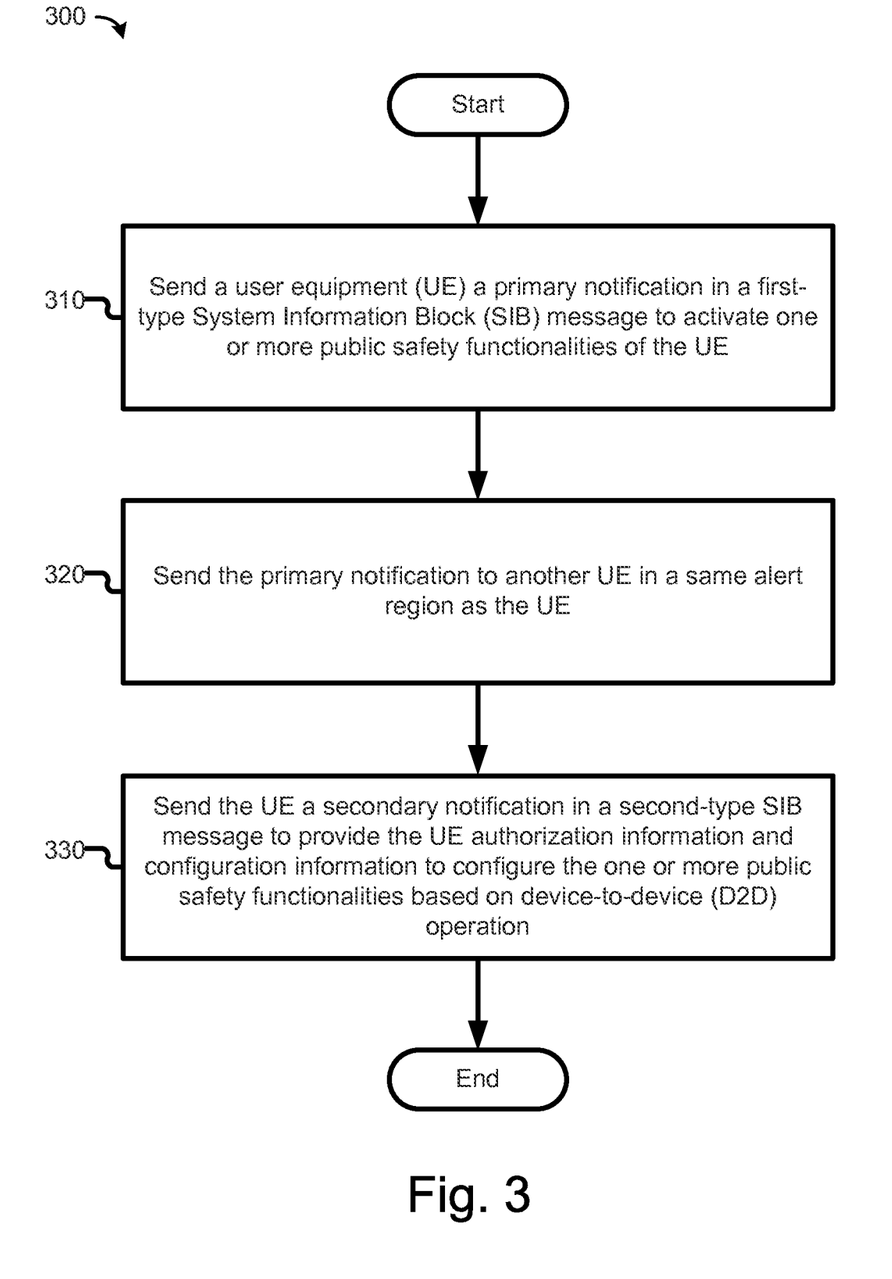
FIG. 3 is a flowchart illustrating a method for enabling D2D functionality for public safety applications in accordance with various embodiments.

FIG. 3 is a flowchart illustrating a method 300 for enabling D2D functionality for public safety applications in accordance with various embodiments. The method 300 may be performed by an eNB, e.g., the eNB 210 of FIG. 2 or the eNB 124 of FIG. 1. In various embodiments, the method 300 may be a unified method to activate D2D-capable devices within an area of emergency into a Public Safety mode, to form a group of D2D Public Safety users within the area, or even to construct an ad hoc network among D2D-capable devices in view of the emergency.

In some embodiments, the method 300 may be implemented to extend a Public Warning System (PWS) as specified within 3GPP (e.g., in 3GPP TS 22.268 V12.2.0 (2013 June)), such as Earthquake and Tsunami Warning System (ETWS), Commercial Mobile Alert System (CMAS), or other regional systems like Korean Public Alert System (KPAS) or EU-ALERT. The method 300 may be a reliable choice to enable Public Safety usages on any cellular-enabled devices regardless of their individually implemented standards because the support of the PWS likely is available in any cellular-enabled devices due to such requirement on a national regulatory basis.

Moreover, the method 300 may piggyback onto the PWS to provide information to the users before the emergency occurs or while the cellular network is still reliable before e.g., being destroyed by a tsunami or a hurricane. Therefore, a system implementing the method 300 may provide the users the connectivity means for later, e.g., after the emergency occurs and/or even after the communication infrastructure is disabled or destroyed.

The method 300 may include, at 310, sending a UE (e.g., the UE 134) a primary notification in a first-type SIB message, for example, by eNB 124, to activate one or more public safety functionalities of the UE. In some embodiments, the primary notification may be sent by the processing circuitry 216 of FIG. 2. In some embodiments, first-type SIB message may be a new SIB for LTE, e.g. System Information Block #17 (SIB#17) for conveying the Primary Notification. The SIB#17 may contain, but is not limited to, a region-wide or maximum extent alert and information for activating Public Safety functionalities of D2D-enabled devices. In some embodiments, Public Safety functionalities may include discovery, communication, or relay functionality.

In some embodiments, the first-type SIB message conveying the primary notification may be sent to a ProSe/LTE-Direct-enabled UE about a predicted Public Safety incident via Paging. The Paging message containing the primary notification may be used to inform ProSe/LTE-Direct-enabled UEs in the RRC_IDLE status or in the RRC_CONNECTED status about the request to wake up Public-Safety functionality. In various embodiments, the Paging message containing the primary notification may be sent to the targeted UEs within four seconds in case the Public Safety incident involves upcoming full or partial damages to the cellular network infrastructure.

In some embodiments, the primary notification may activate all applicable operation modes (e.g., communication) in the UE. In some embodiments, dependent on regulatory requirements, public safety functionalities may be enabled despite pre-configured user, OEM, operator, or company policies associated with a UE. In some embodiments, the public safety mode may be activated independent of the underlying standard (e.g., LTE Direct or ProSe) as well as the device configuration status (e.g., idle or connected).

The method 300 may further include, at 320, sending the primary notification to another UE (e.g., the UE 136) in a same alert region as the UE (e.g., the UE 134). In some embodiments, the sending of the primary notification to other UEs may be performed by the processing circuitry 216 of FIG. 2. The processing circuitry 216 may employ other circuitry, such as transceiver circuitry 214, and/or antennas 218, to effect the transmission of the primary notification.

In embodiments, the functionality of a PWS may be extended by this disclosure. For example, SIB#17 may not only notify a UE about an upcoming danger, but also carry information toward the UE that enables a certain set or sub-set of Public Safety functionality based on ProSe, LTE-Direct, or any other D2D standard existing now or in the future, whichever is implemented on the device.

The underlying different D2D standards may not be enabled in every UE for those Public Safety use cases. The method 300 uses a new SIB for LTE, e.g., SIB#17, for conveying the primary notification; therefore, it may ubiquitously enable those D2D-enabled devices regardless of the underlying D2D standards, e.g., regardless of ProSe or LTE-Direct.

Furthermore, at 320, as the primary notification may be sent to all addressable UEs in the alert region, the receiving UEs within the alert region may be enabled to provide Public Safety communication upon the emergency alert distributed through the PWS. Furthermore, these UEs may be ready for D2D operation when the emergency appears or even when the cellular network is impaired.

The method 300 may further include, at 330, sending the UE (e.g., the UE 134) a secondary notification in a second-type SIB message to provide the UE authorization information and configuration information to configure the one or more public safety functionalities based on D2D operation. In some embodiments, the secondary notification may be sent by the processing circuitry 216 of FIG. 2. In some embodiments, the processing circuitry 216 may cooperate with the transceiver circuitry 214 to transmit the secondary notification. In various embodiments, the secondary notification may be transmitted on the physical downlink shared channel (PDSCH) as the BCCH can be mapped to the PDSCH In embodiments, another new SIB for LTE, e.g. System Information Block #18 (SIB#18), may be used to provide the secondary notification. In some embodiments, the secondary notification may contain, but is not limited to, authorization for D2D operation or configuration information for D2D operation. In some embodiments, the secondary notification may further contain assistance information for preferred spectrum for D2D operation or assistance information for D2D synchronization source set-up. In some embodiments, the secondary notification may further contain specification of ProSe incident area information, e.g., to direct ad hoc network set-up. Yet in some embodiments, the secondary notification may further contain a time stamp of the alert or a Public Safety release message.

The information contents for primary or secondary notifications in GERAN and UTRAN may be the same as for LTE. In both GERAN and UTRAN, the secondary notifications may be sent via Cell Broadcast Service (CBS) that may be similar to the CBS described in 3GPP TS 23.041 (e.g., 3GPP TS 23.041 V12.6.0 (2014 June)) where new, specific message identifications may be specified for Public Safety purposes in various embodiments. In UTRAN, the Paging Type 1 message may be used to send the ProSe/LTE-Direct-Indication to ProSe/LTE-Direct-enabled UEs in RRC_IDLE, and System Information Change Indication or a new, dedicated message to inform UEs in RRC_CONNECTED. As for the ETWS-Indication, if the UE receives the ProSe/LTE-Direct-Indication in GERAN or UTRAN, the UE may activate the reception of cell broadcast messages containing the secondary notifications.

For GERAN/UTRAN, a similar mechanism as for ETWS may be implemented for sending the primary and secondary notifications. As an example, in GERAN, the ProSe/LTE-Direct-Indication and the primary notification may be sent in Paging messages, in Application Information messages that may be similar to Application Information messages described in 3GPP TS 44.018 (e.g., 3GPP TS 44.018 V12.2.0 (2014 March)) or Packet Application Information message (e.g., see 3GPP TS 44.060 V12.1.0 (2014 June)). In UTRAN, the ProSe/LTE-Direct-Indication and the primary notification may be sent in a Paging Type 1 messages, a System Information Change Indication (e.g., see 3GPP TS 25.331 V12.2.0 (2014 June)), or in a new dedicated RRC message specifically for UEs in connected mode.

In various embodiments, numerous UEs receiving the primary and secondary notifications may start D2D reception and transmission for D2D discovery and communication. A device still in network coverage and capable of as well as authorized for Public Safety relaying would set up relay functionality, start synchronization signaling (D2DSS), and recruit further devices for ad hoc networking to prepare for a potential out-of-network coverage emergency case. Other ProSe/LTE-Direct-enabled devices may synchronize with the synchronization source (e.g., D2D relay or eNB in reach) and start broadcasting/group-casting, e.g., their position in a destroyed building, or start transmitting D2D discovery pilots. Therefore, rescue teams may find a UE based on its D2D operation, independent of cellular network coverage or cellular network load.

Eventually, the Public Safety use case may be disabled by the same means as discussed above when the emergency ceased, e.g., via a Public Safety Release notification message contained in another SIB#17 or SIB#18 message.

Figure 4:
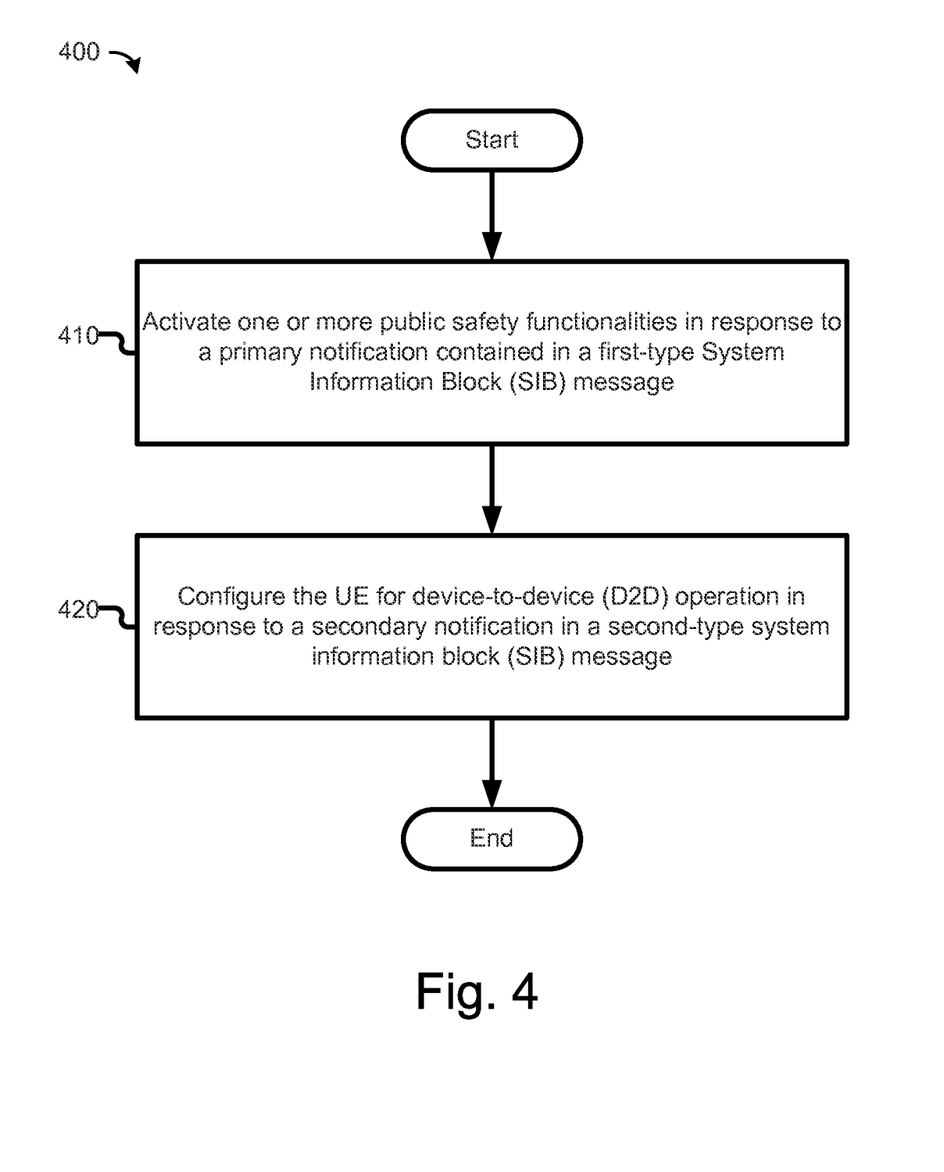
FIG. 4 is a flowchart illustrating another method for enabling D2D functionality for public safety applications in accordance with various embodiments.

FIG. 4 is a flowchart illustrating another method 400 for enabling D2D functionality for public safety applications in accordance with various embodiments. The method 400 may be performed by a UE, e.g., the UE 220 of FIG. 2 or anyone of the UEs of FIG. 1, such as the UE 132, 134, or 136.

The method 400 may include, at 410, activating one or more public safety functionalities in response to a primary notification contained in a first-type SIB message. In some embodiments, the activating of the public safety functionalities may be done by the processing circuitry 226 of FIG. 2. In some embodiments, the one or more public safety functionalities may be defined in LTE ProSe or LTE Direct. In various embodiments, a UE receiving the primary notification may enter into a public safety mode to active relevant public safety functionalities independent of whether LTE Direct, ProSe, or another D2D standard is enabled in the UE. In various embodiments, a UE receiving the primary notification may activate relevant public safety functionalities independent of the UE's connection status, e.g., idle or connected.

In some embodiments, a UE receiving the primary notification may further activate a reception mode to receive cell broadcast messages containing a secondary notification, which may further include D2D configuration information. In some embodiments, a UE receiving the primary notification may present an audio or visual message to a user of the UE of a public safety alert contained in the primary notification. In some embodiments, a UE receiving the primary notification may generate notifications informing a user of the public safety functions available on the UE. Therefore, the user of the UE may be made aware of such available public safety functions.

The method 400 may further include, at 420, configuring the UE for D2D operation, in response to a secondary notification in a received second-type system information block (SIB) message. In some embodiments, configuring the UE for D2D operation may be done by the processing circuitry 226 of FIG. 2. In some embodiments, the UE may be configured for D2D operation based at least in part on information for the preferred spectrum for D2D operation or information for D2D synchronization source set-up contained in the secondary notification. In some embodiments, the UE may set up relay functionalities when the UE is capable and authorized for public safety relaying based on the secondary notification. In some embodiments, the UE may recruit another UE for ad hoc networking. In some embodiments, the UE may perform device-to-device synchronization signaling (D2DSS) with another UE for a D2D operation session.

The UE 220 as described in connection with FIG. 2 may be implemented into a system using any suitable hardware, firmware, and/or software configured as desired. FIG. 5 illustrates, for one embodiment, an example system 500 comprising radio frequency (RF) circuitry 504, baseband circuitry 508, application circuitry 512, memory/storage 516, display 520, camera 524, sensor 528, and input/output (I/O) interface 532, coupled with each other at least as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications and/or operating systems running on the system 500.

The baseband circuitry 508 may include circuitry such as, but not limited to, one or more single-core or multi-core processors. The processor(s) may include a baseband processor. The baseband circuitry 508 may handle various radio control functions that enable communication with one or more radio networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an E-UTRAN and/or other WMAN, a WLAN, or a WPAN. Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

In some embodiments, the processing circuitry 216 or 226 of FIG. 2 may be embodied in the application circuitry 512 and/or the baseband circuitry 508.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In some embodiments, the transceiver circuitry 214 or 224 of FIG. 2 may be embodied in the RF circuitry 504.

In some embodiments, some or all of the constituent components of the baseband circuitry 508, the application circuitry 512, and/or the memory/storage 516 may be implemented together on a system on a chip (SOC).

Memory/storage 516 may be used to load and store data and/or instructions, for example, for system 500. Memory/storage 516 for one embodiment may include any combination of suitable volatile memory (e.g., dynamic random access memory (DRAM)) and/or non-volatile memory (e.g., Flash memory).

In various embodiments, the I/O interface 532 may include one or more user interfaces to enable user interaction with the system 500 and/or peripheral component interfaces to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions and/or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 and/or RF circuitry 504 to communicate with components of a positioning network, e.g., a global positioning system (GPS) satellite.

In various embodiments, the display 520 may include a display, e.g., a liquid crystal display, a touch screen display, etc. In some embodiments, the camera 524 may include many molded plastic aspheric lens elements made with varying dispersion and refractive indexes. In some embodiments, the camera 524 may include two or more lenses to capture three-dimensional images for stereo photography.

In various embodiments, the system 500 may be a mobile computing device such as, but not limited to, a laptop computing device, a tablet computing device, a netbook, an ultrabook, a smartphone, etc. In various embodiments, system 500 may have more or fewer components, and/or different architectures.

Figure 6:
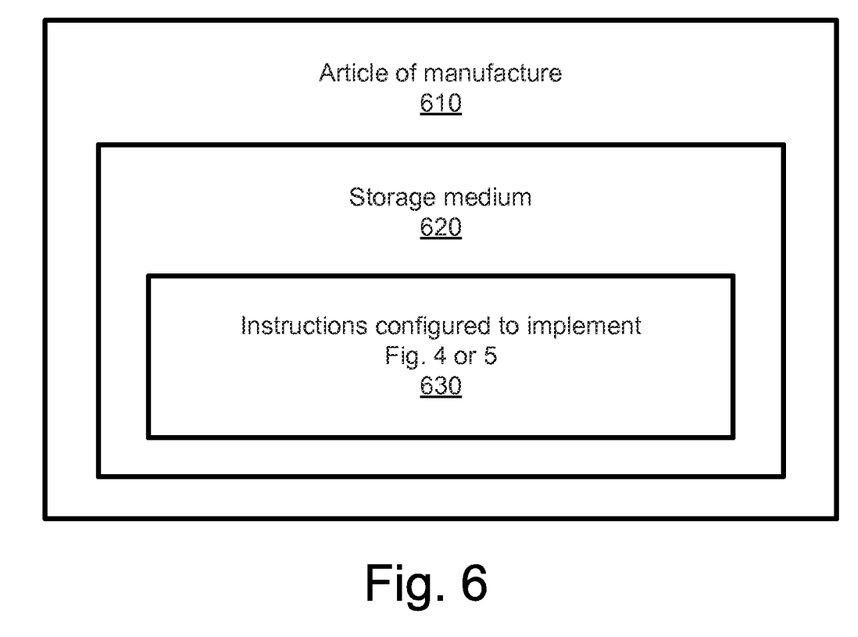
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions 630 are configured to practice embodiments of or aspects of embodiments of any one of the processes described herein. The storage medium 620 may represent a broad range of persistent storage media known in the art, including but not limited to flash memory, dynamic random access memory, static random access memory, an optical disk, a magnetic disk, etc. In embodiments, computer-readable storage medium 620 may include one or more computer-readable non-transitory storage media. In other embodiments, computer-readable storage medium 620 may be transitory, such as signals, encoded with instructions 630.

In various embodiments, instructions 630 may enable an apparatus, in response to its execution by the apparatus, to perform various operations described herein. As an example, storage medium 620 may include instructions 630 configured to cause an apparatus, e.g., eNB 210 in connection with FIG. 2, to practice some aspects of enabling D2D functionality for public safety applications, e.g., as illustrated in method 300 of FIG. 3, in accordance with embodiments of the present disclosure. As another example, storage medium 620 may include instructions 630 configured to cause an apparatus, e.g., UE 220 in connection with FIG. 2, to practice some aspects of enabling D2D functionality for public safety applications, e.g., as illustrated in method 400 of FIG. 4, in accordance with embodiments of the present disclosure.

The following paragraphs describe examples of various embodiments.

Example 1 is an eNB including processing circuitry to generate a System Information Block (SIB) message for activating device-to-device (D2D) operation of one or more public safety functionalities of a user equipment (UE); and transceiver circuitry, coupled to the processing circuitry, to send the SIB message to the UE.

Example 2 includes the subject matter of example 1, wherein the processing circuitry is to use the SIB message to activate at least one of D2D discovery, D2D communication, or D2D relay functionality of the UE.

Example 3 includes the subject matter of example 1 or 2, wherein the SIB message is a first-type SIB message for primary notification, and the processing circuitry is further to generate a second-type SIB message for secondary notification including authorization or configuration information for D2D operation.

Example 4 includes the subject matter of any one of examples 1-3, wherein the second-type SIB message comprises information related to a preferred frequency spectrum for D2D operation, information for D2D synchronization source set-up, a public safety alert, or a public safety release message.

Example 5 includes the subject matter of any one of examples 1-4, wherein the transceiver circuitry is to send the second-type SIB message via Cell Broadcast Service, or the transceiver circuitry is to send the SIB message to the UE via Paging.

Example 6 includes the subject matter of any one of examples 1-5, wherein the transceiver circuitry is to send the SIB message to a plurality of UEs in an alert region.

Example 7 is a method for enabling D2D functionality for public safety applications. The method may include sending, by an evolved NodeB (eNB), a user equipment (UE) a primary notification in a first-type System Information Block (SIB) message to activate one or more public safety functionalities of the UE; and sending, by the eNB, the UE a secondary notification in a second-type SIB message to provide the UE authorization information and configuration information to configure the device-to-device (D2D) operation underlying the one or more public safety functionalities.

Example 8 includes the subject matter of example 7, and may further include sending the primary notification to another UE in a same alert region as the UE.

Example 9 includes the subject matter of example 7 or 8, wherein the primary notification is to activate at least one of D2D discovery, D2D communication, or D2D relay functionality of the UE.

Example 10 includes the subject matter of any one of examples 7-9, wherein the secondary notification comprises information for preferred spectrum for D2D operation and information for D2D synchronization source set-up.

Example 11 includes the subject matter of any one of examples 7-10, wherein the primary notification is sent to the UE via Paging, and wherein the secondary notification is sent to the UE via Cell Broadcast Service.

Example 12 includes the subject matter of any one of examples 7-11, wherein the one or more public safety functionalities comprises a subset of Long-Term Evolution (LTE) Proximity Services (ProSe) or LTE Direct public safety functionalities.

Example 13 is at least one storage medium having instructions configured to cause an apparatus, in response to execution of the instructions by the apparatus, to practice any subject matter of Examples 7-12.

Example 14 is an apparatus for wireless communication, which may include means to practice any subject matter of Examples 7-12.

Example 15 is a user equipment (UE) including a transceiver circuitry to communicate with another UE via device-to-device (D2D) operation and to communicate with an evolved Node B (eNB); and processing circuitry connected to the transceiver circuitry to: activate the UE into a public safety mode in response to a primary notification in a system information block (SIB) message received from the eNB; and configure the UE for one or more public safety functionalities based on D2D operation.

Example 16 includes the subject matter of example 15, wherein the transceiver circuitry is to receive the primary notification in a Paging Type 1 message if the UE is in an RRC_IDLE state, and wherein the transceiver circuitry is to receive the primary notification in a System Information Change Indication message if the UE is in an RRC_CONNECTED state.

Example 17 includes the subject matter of example 15 or 16, wherein the processing circuitry is to facilitate presentation, in response to the primary notification, of an audio or visual message to a user of the UE of one or more public safety features enabled at the UE and information of a public safety alert contained in the primary notification.

Example 18 includes the subject matter of any one of examples 15-17, wherein the radio transceiver is to communicate with the another UE via Long-Term Evolution (LTE) Proximity Services (ProSe) or LTE Direct.

Example 19 includes the subject matter of any one of examples 15-18, wherein the processing circuitry is to activate, in response to the primary notification, a reception of one or more cell broadcast messages containing one or more secondary notifications with authorization or configuration information for D2D operation.

Example 20 includes the subject matter of example 19, wherein the one or more secondary notifications comprises information related to preferred spectrum for D2D operation or information for D2D synchronization source set-up.

Example 21 is a method for enabling D2D functionality for public safety applications. The method may include activating one or more Long-Term Evolution (LTE) Proximity Services (ProSe) or LTE Direct public safety functionalities in response to a primary notification contained in a first-type System Information Block (SIB) message; and configuring the UE for device-to-device (D2D) operation in response to a secondary notification in a second-type system information block (SIB) message.

Example 22 includes the subject matter of example 21, and further includes activating, in response to the primary notification, a reception of one or more cell broadcast messages containing the secondary notification.

Example 23 includes the subject matter of example 21 or 22, and further includes configuring the UE for D2D operation based at least in part on information for preferred spectrum for D2D operation or information for D2D synchronization source set-up contained in the secondary notification.

Example 24 includes the subject matter of any one of examples 21-23, and further includes setting up relay functionalities when the UE is capable and authorized for public safety relaying.

Example 25 includes the subject matter of any one of examples 21-24, and further includes recruiting another UE for ad hoc networking.

Example 26 includes the subject matter of example 25, and further includes performing device-to-device synchronization signaling (D2DSS) with the other UE.

Example 27 includes the subject matter of any one of examples 21-26, and includes presenting, in response to the primary notification, an audio or visual message to a user of the UE of a public safety alert contained in the primary notification.

Example 28 is at least one storage medium having instructions configured to cause an apparatus, in response to execution of the instructions by the apparatus, to practice any subject matter of Examples 21-27.

Example 29 is an apparatus for wireless communication, which may include means to practice any subject matter of Examples 21-27.

The description herein of illustrated implementations, including what is described in the Abstract, is not intended to be exhaustive or to limit the present disclosure to the precise forms disclosed. While specific implementations and examples are described herein for illustrative purposes, a variety of alternate and/or equivalent embodiments or implementations calculated to achieve the same purposes may be made in light of the above detailed description, without departing from the scope of the present disclosure, as those skilled in the relevant art will recognize.

What is claimed is:

1. An evolved Node B (eNB), comprising:
   processing circuitry to generate a System Information Block (SIB) message to activate device-to-device (D2D) operation of one or more public safety functionalities of a user equipment (UE); and
   transceiver circuitry, coupled to the processing circuitry, to send the SIB message to the UE,
   wherein the SIB message is a first-type SIB message for primary notification, and the processing circuitry is further to generate a second-type SIB message for secondary notification including authorization or configuration information for D2D operation and information related to a preferred frequency spectrum for D2D operation.

2. The eNB of claim 1, wherein the processing circuitry is to use the SIB message to activate at least one of D2D discovery, D2D communication, or D2D relay functionality of the UE.

3. The eNB of claim 1, wherein the second-type SIB message further comprises information related to a D2D synchronization source set-up, a public safety alert, or a public safety release message.

4. The eNB of claim 1, wherein the transceiver circuitry is to send the second-type SIB message via Cell Broadcast Service, or the transceiver circuitry is to send the SIB message to the UE via Paging.

5. The eNB of claim 1, wherein the transceiver circuitry is to send the SIB message to a plurality of UEs in an alert region.

6. A method, comprising:
   sending, by an evolved NodeB (eNB), a user equipment (UE) a primary notification in a first-type System Information Block (SIB) message to activate one or more public safety functionalities of the UE independent of whether a selected device-to-device (D2D) standard is enabled on the UE; and
   sending, by the eNB, the UE a secondary notification in a second-type SIB message to provide the UE authorization information and configuration information to configure D2D operation underlying the one or more public safety functionalities.

7. The method of claim 6, further comprising:
   sending the primary notification to another UE in a same alert region as the UE.

8. The method of claim 6, wherein the primary notification is to activate at least one of D2D discovery, D2D communication, or D2D relay functionality of the UE.

9. The method of claim 6, wherein the secondary notification comprises information for preferred spectrum for D2D operation and information for D2D synchronization source set-up.

10. The method of claim 6, wherein the primary notification is sent to the UE via Paging, and wherein the secondary notification is sent to the UE via Cell Broadcast Service.

11. The method of claim 6, wherein the one or more public safety functionalities comprises a subset of Long-Term Evolution (LTE) Proximity Services (ProSe) or LTE Direct public safety functionalities.

12. A user equipment (UE), comprising:
 transceiver circuitry to communicate with another UE via device-to-device (D2D) operation and to communicate with an evolved Node B (eNB); and
 processing circuitry connected to the transceiver circuitry to:
  activate the UE into a public safety mode in response to a primary notification in a system information block (SIB) message received from the eNB independent of whether a selected D2D standard is enabled on the UE; and
  configure the UE for one or more public safety functionalities based on D2D operation.

13. The UE of claim 12, wherein the transceiver circuitry is to receive the primary notification in a Paging Type 1 message if the UE is in an RRC_IDLE state, and wherein the transceiver circuitry is to receive the primary notification in a System Information Change Indication message if the UE is in an RRC_CONNECTED state.

14. The UE of claim 12, wherein the processing circuitry is to facilitate presentation, in response to the primary notification, of an audio or visual message to a user of the UE of one or more public safety features enabled at the UE and information of a public safety alert contained in the primary notification.

15. The UE of claim 12, wherein a radio transceiver is to communicate with the other UE via Long-Term Evolution (LTE) Proximity Services (ProSe) or LTE Direct.

16. The UE of claim 12, wherein the processing circuitry is to activate, in response to the primary notification, a reception of one or more cell broadcast messages containing one or more secondary notifications with authorization or configuration information for D2D operation.

17. The UE of claim 16, wherein the one or more secondary notifications comprises information related to preferred spectrum for D2D operation or information for D2D synchronization source set-up.

18. One or more non-transitory computer-readable media having instructions that, when executed by one or more processors of a user equipment (UE), cause the UE to:
 activate one or more public safety functionalities of a Long-Term Evolution (LTE) Proximity Services (ProSe) device-to-device (D2D) standard or an LTE Direct D2D standard in response to a primary notification contained in a first-type System Information Block (SIB) message that is independent of whether a selected D2D standard is enabled on the UE; and
 configure the UE for D2D operation in response to a secondary notification in a second-type system information block (SIB) message.

19. The one or more non-transitory computer-readable media of claim 18, wherein the instructions, when executed, further cause the UE to activate, in response to the primary notification, a reception of one or more cell broadcast messages containing the secondary notification.

20. The one or more non-transitory computer-readable media of claim 18, wherein the instructions, when executed, further cause the UE to be configured for D2D operation based at least in part on information for preferred spectrum for D2D operation or information for D2D synchronization source set-up contained in the secondary notification.

21. The one or more non-transitory computer-readable media of claim 18, wherein the instructions, when executed, further cause the UE to set up relay functionalities when the UE is capable and authorized for public safety relaying.

22. The one or more non-transitory computer-readable media of claim 18, wherein the instructions, when executed, further cause the UE to recruit another UE for ad hoc networking.

23. The one or more non-transitory computer-readable media of claim 22, wherein the instructions, when executed, further cause the UE to perform device-to-device synchronization signaling (D2DSS) with the other UE.

24. The one or more non-transitory computer-readable media of claim 18, wherein the instructions, when executed, further cause the UE to present, in response to the primary notification, an audio or visual message to a user of the UE of a public safety alert contained in the primary notification.

* * * * *